J. T. COWLEY.
PNEUMATIC AMMUNITION CONVEYING APPARATUS.
APPLICATION FILED AUG. 31, 1908.

1,148,079.

Patented July 27, 1915.
10 SHEETS—SHEET 1.

Fig. 1.

Witnesses:

Inventor:

J. T. COWLEY.
PNEUMATIC AMMUNITION CONVEYING APPARATUS.
APPLICATION FILED AUG. 31, 1908.

1,148,079.

Patented July 27, 1915.
10 SHEETS—SHEET 3.

UNITED STATES PATENT OFFICE.

JAMES T. COWLEY, OF BOSTON, MASSACHUSETTS, ASSIGNOR TO THE LAMSON COMPANY, OF NEWARK, NEW JERSEY, A CORPORATION OF NEW JERSEY.

PNEUMATIC AMMUNITION-CONVEYING APPARATUS.

1,148,079.

Specification of Letters Patent.

Patented July 27, 1915.

Application filed August 31, 1908. Serial No. 451,061.

*To all whom it may concern:*

Be it known that I, JAMES T. COWLEY, of Boston, in the county of Suffolk and State of Massachusetts, have invented certain new and useful Improvements in Pneumatic Ammunition-Conveying Apparatus, of which the following is a specification.

My invention relates to improvements in pneumatic ammunition conveying apparatus, and its object is to provide means for the rapid, safe and efficient conveying of ammunition from the handling room of a magazine to the guns.

The apparatus comprises a conduit or tube through which the ammunition is pneumatically propelled from the handling room to a point near the guns, said tube being provided with a sending terminal at the handling room end thereof, and with a delivery terminal at the opposite end of said tube near the guns, the tube and terminals forming a system normally closed to the handling room and turret. The delivery terminal is preferably horizontal and is provided with means for retarding and cushioning the ammunition, and the ammunition is transmitted by air from a reservoir of such capacity that the compressed air is nearly exhausted in transmitting a charge of ammunition, these features securing the safe delivery of the ammunition. An automatically acting valve closes the air inlet after a charge transmission, and the reservoir is automatically refilled to the required pressure.
Means are provided at the delivery terminal for stopping the piston or carrier and separating it from the ammunition, and a projectile is preferably transmitted butt foremost with a cap fitting over the point of the projectile and formed with a rim fitting the interior of the conveyer tube to form the piston. Safety devices are provided to prevent the sending of ammunition while a charge is in the receiver at the delivery terminal and until the receiver has been closed to receive another charge, and for preventing the opening of the receiver until the ammunition has been received or the closing of the receiver after opening until the ammunition has been removed. The safety devices also include the closing of the conduit or tube except at the receiver while the receiver is open, and means for preventing the opening of the tube between the receiver and handling room until the receiver is again closed, so that the system is never open from the turret to the handling room.

Apparatus embodying the general features of the invention may be designed for transmitting only the projectile or the powder, or for transmitting the projectiles and powder separately, but the apparatus in its complete form and as herein shown is adapted to transmit at one time the complete charge for a gun, that is, both powder and projectile. In this apparatus, the delivery terminal has two receivers, one for the powder and the other for the projectile, and means are provided for separating the powder and projectile and securing their proper delivery into their respective receivers. Both receivers are preferably normally locked closed, and one or both automatically unlocked by the receipt of a charge, and as herein shown the receipt of the projectile automatically unlocks the powder receiver and the opening of the powder receiver automatically unlocks the projectile receiver. The receivers are preferably so constructed that they may be opened from either side for the convenient delivery of the ammunition to either of two guns between which the receivers may be located, in which case the opening of the powder receiver on one side unlocks the door of the projectile receiver on the same side. The projectile receiver doors when open act as shelves to support the projectile, and in opening operate mechanism to automatically shift the projectile from the receiver. Both receivers are included in the safety devices, and the proper closure of both receivers permits the sending of another charge and serves as a signal to the operator at the sending terminal, this being done in the apparatus shown by opening the gate at the sending terminal for the insertion of another charge.

The invention includes other features as hereinafter described and claimed.

In the accompanying drawings is illustrated a construction embodying my invention in which,—

Like numerals of reference refer to like parts throughout the several views.

Referring to the drawings 1 represents a sending terminal located in the handling room of a war vessel and 2 the conveyer or transmission tube leading therefrom up through the usual shaft 3 to the turret of the vessel. The tube 2 is made in two relatively rotatable parts connected by a swivel joint 5 so that the upper portion of said tube can rotate with the turret relatively to the lower part thereof. The turret 4 is made with a depending portion 5ª through which tube 2 extends, and which at its lower end is provided with a worm gear 6 engaged as usual by one or more worms 7 by means of which the turret is rotated. At its upper end and within the turret 4 the conveyer tube 2 is provided with a delivery terminal 8 made with a projectile receiver 9 and powder receiver 10.

The operation of the apparatus briefly described is as follows:—The operator in the handling room assembles the charge including the powder bags 12 and projectile 13 on an inclined shelf 11 the lower end of which is opposite the inlet of the sending terminal 1. When the gate of the terminal 1 is opened by the gunner from the turret above through the means to be described hereinafter, the operator shoves the charge from the shelf 11 into said terminal 1, then closes the gate of said terminal and through means described later admits a charge of air under pressure from a reservoir 14, through pipe 14ª, into the terminal 1 behind the projectile 13. The pressure of this air forces the projectile and the powder up through tube 2, the powder being delivered into the receiver 10 and the projectile into the receiver 9. After the powder and the projectile have been removed the receivers 9 and 10 are closed which acts to automatically open the gate of the sending terminal 1 serving as a signal to the operator to insert and despatch another charge. Since no other means are provided for opening the gate of the sending terminal 1, it is therefore impossible for a second charge to be inserted and despatched until the first charge has been removed from the receivers 9 and 10 and the same locked closed.

As herein shown it is intended to have the reservoir 14 of such capacity that the compressed air contained therein is nearly exhausted just before the charge traveling through tube 2 reaches the terminal 8, and to utilize the momentum of the charge to deliver the same into the receivers. In this way the charge is delivered at the turret gently and without shock.

In order to refill reservoir 14 after each operation said tank is connected by a pipe 15 with a main source of compressed air and in this pipe 15 is a reducing valve V of ordinary construction which acts automatically to refill reservoir 14 after each operation to a predetermined pressure.

Figure 1:
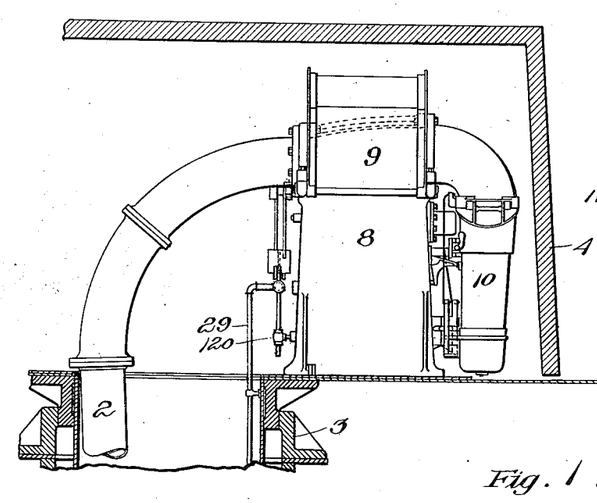
Figure 1 is a sectional elevation partly broken away showing the conveying apparatus as adapted to the transmission of ammunition from the magazine of a war vessel to the turrets thereof.
Figure 2:
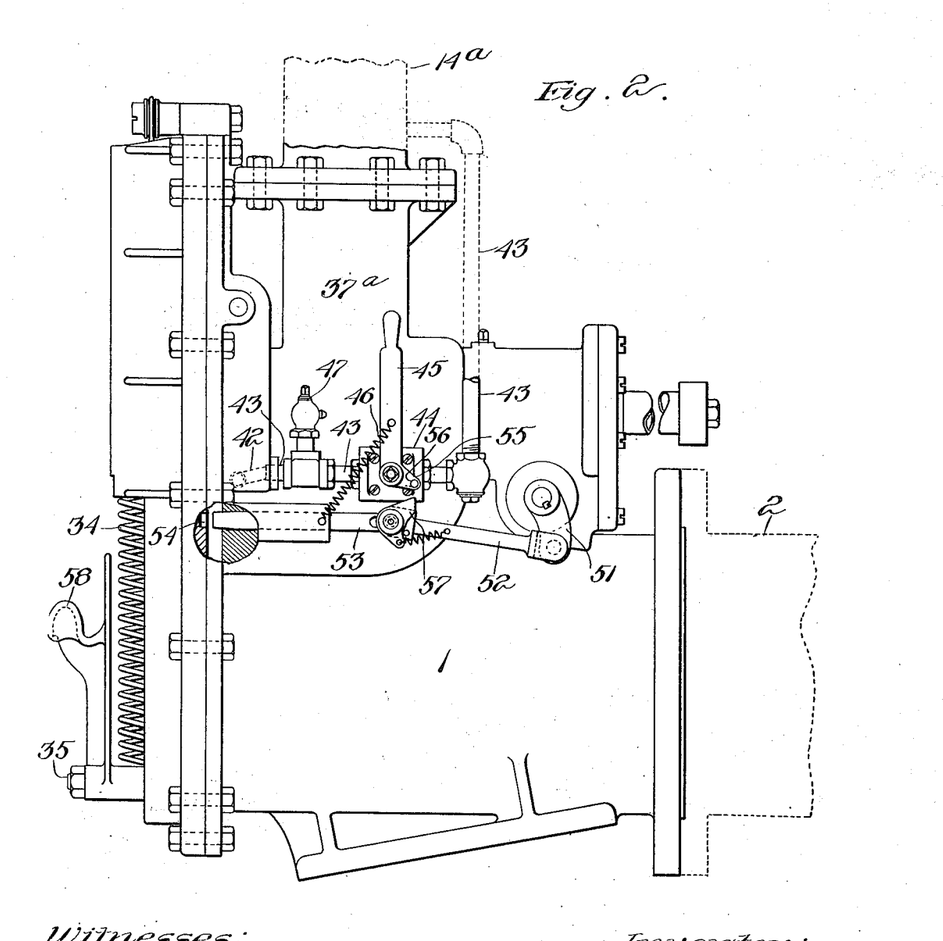
Fig. 2 is an enlarged side elevation of the sending terminal of the apparatus shown in Fig. 1.

The sending terminal, see Figs. 2, 3, 4 and 5, is connected with the lower end of the tube 2 at one end and at its other end is provided with a gate 16 mounted to slide vertically in ways 17 on the body of said terminal. Normally this gate 16 is locked in its closed position by two latches 18 and 19 fast to the shaft 20 and engaging abutments on said gate. The latch 18 at its lower end carries a pivoted pawl or dog 21 normally held by a spring 22 in engagement with a plunger 23 which is connected with a piston 24 arranged in a cylinder 26, one end of said piston being of smaller area than the other end thereof. The small end of the cylinder 26 is connected by a pipe 28 see Figs. 1 and 3, with the pipe 14ª, while the other end of said cylinder is connected by a pipe 29 with the turret 4. The upper part of the pipe 29 is connected with the lower part adjacent the swivel joint 5, by a flexible pipe 29ª, preferably rubber, so that the upper part of said pipe 29 can swing around with the turret 4 relatively to the lower part of said pipe.

31 is a bypass connecting the pipe 29 with the small end of the cylinder 26 with which pipe 28 also connects. In this bypass 31 is a valve 32 which restricts the capacity of said bypass 31 so that it is much less than the capacity of either pipe 28 or 29. The middle part of cylinder 26 is connected with the atmosphere through a vent 33. If either of the receivers 9 or 10 are open the upper end of the pipe 29 is closed and the pressure within the opposite ends of the cylinder 26 is equalized by the bypass 31 and the pressure acting on the greater area of the large end of piston 24 causes the latter to be held in the position shown in Fig. 3 with the plunger 23 in engagement with the dog 21. When both the receivers 9 and 10 however are closed, the upper end of the pipe 29 is opened causing the air in the large end of the cylinder 26 to exhaust permitting the piston 24 to be moved by the pressure on its small end to the left of the position shown in Fig. 3, causing the plunger 23 to move pawl 21 and release the gate 16 from latches 18 and 19. A spring 34 connected at its upper end with the body of the terminal 21 and at its lower end with a stud 35 projecting from gate 16 thereupon lifts said gate opening the terminal. As the pawl 21 is thus operated by the plunger 23, a finger 36 on said pawl engages an abutment 37 on the body of the terminal thereby disengaging said pawl and plunger whereupon the spring 22 returns latches 18 and 19 to operative position, that is, in position to relock said gate 16 when it is again closed.

Figure 5:
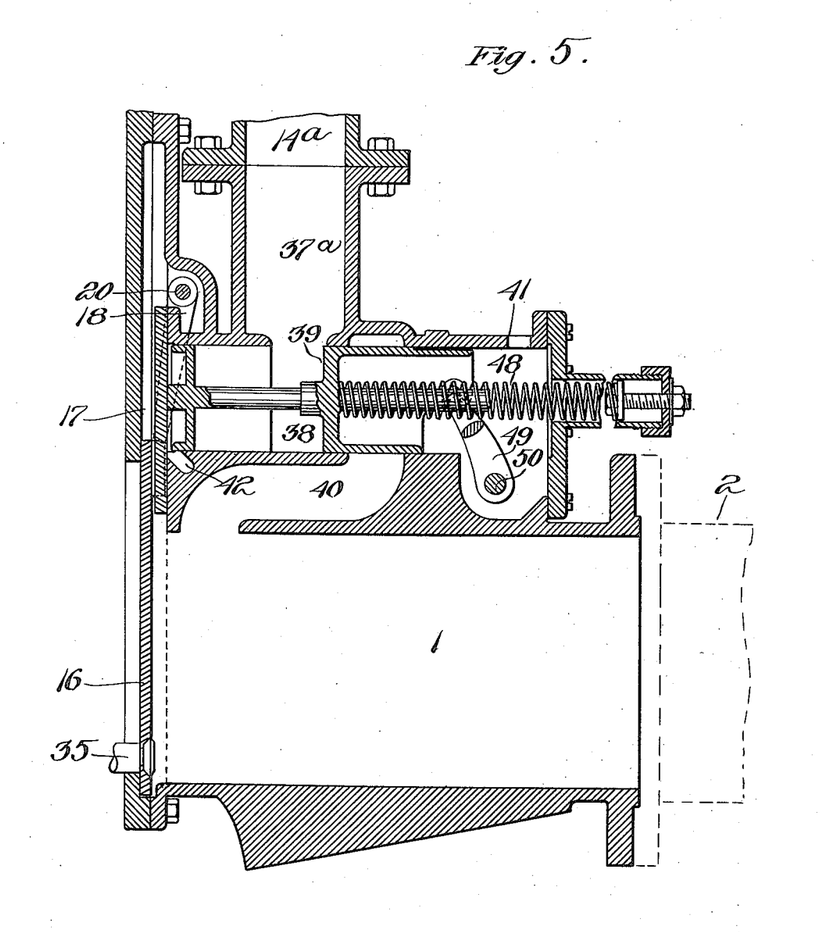
Fig. 5 is a central vertical longitudinal section through the sending terminal shown in Fig. 2.
Figure 6:
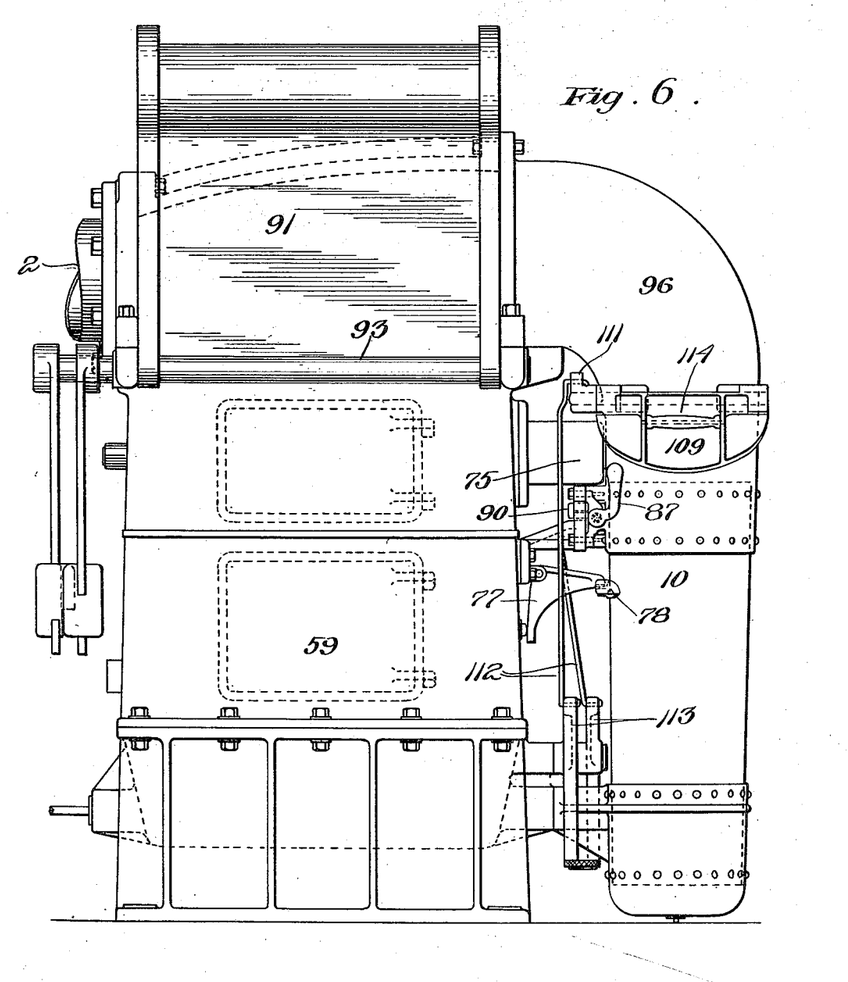
Fig. 6 is an enlarged side elevation of the delivery terminal of the apparatus shown in Fig. 1.

The pipe 14ª communicates with a port 37ª in the body of terminal 1, Fig. 5, and which port 37ª communicates with a chamber 38 within which is mounted a balanced valve 39 controlling communication between port 37ª and a port 40 leading to the charge receiving chamber of said terminal 1. The right hand end (Fig. 5) of cylinder 38 communicates with the atmosphere through a vent 41, while the left hand end thereof is connected by a port 42 with a pipe 43 connected with the pipe 14ª as indicated by dotted lines in Fig. 2. In this pipe 43 is a normally closed valve 44 having a handle 45 by means of which said valve is controlled by the operator. A spring 46 normally holds handle 45 in its closed position and said spring is so arranged as to hold said handle in its open position when it is moved downward to the right in Fig. 5. In the pipe 43, between valve 44 and port 42, is a restricted vent 47 of small capacity leading to the atmosphere. Normally the valve 39 occupies the closed position shown in Fig. 5, but when it is desired to send a charge to the turret 4, the operator closes the gate 16 by handle 58 on stud 35 and opens valve 44 by swinging handle 45 down to the right where it is held by spring 46. The air under pressure then passes from pipe 14ª through pipe 43 and port 42 into the left hand end (Fig. 5) of cylinder 38 thus forcing valve 39 to the right and opening communication between ports 37ª and 40. As heretofore stated the charge of compressed air thus admitted to the tube 2 is nearly exhausted by the time the charge reaches the turret and of course the pressure of the air admitted to the left hand end of the cylinder 38 falls correspondingly thus allowing a spring 48 to shift valve 39 back toward its normal closed position. The right hand end of valve 39 is connected with an arm 49 fast to a rock shaft 50 journaled on the body of the terminal and at its outer end said shaft carries fastened thereto another arm 51 connected by a link 52 with one end of a bolt 53 mounted to slide in a bearing on the body of the terminal. When valve 39 is shifted to the right through the opening of valve 44, the shaft 50 is rocked and acts through arm 51 and link 52 to shift bolt 53 to the left into a socket 54 in gate 16 thus locking said gate closed while the charge is being transmitted. The handle 45 of the valve 44 is made with an arm 55 carrying a laterally projecting stud 56 that is carried into the path of a spring pressed latch 57 on link 52. As link 52 moves to the left with the opening of valve 39, latch 57 snaps idly past stud 56, but when valve 39 is closing, the latch is shifted to the right and engaging stud 56 automatically closes valve 44. The air thereafter escaping from the left hand end of cylinder 38 through port 42 discharges through the restricted vent 47 thereby cushioning and retarding the closure of the valve 39. Secured to the stud 35 of the gate 16 is a handle 58 for closing said gate.

The construction of the delivery terminal 8 located in the turret 4 is particularly illustrated in Figs. 6 to 13 inclusive; the upper end of the tube 2 terminates in the casing 59. The upper part of said casing 59 includes a number of separated bars 60 that constitute the floor of the projectile receiver 9 and are substantially on a level with the bottom of the mouth of tube 2.

Pivoted on a crossbar 61 near the mouth of tube 2 is a pair of inclined levers 62, to each of which is pivotally connected the upper end of a rod 63, the lower end of which rod extends through a crossbar 64 fixed to casing 59. Below bar 64 each rod 63 carries stop-nuts 65 normally held against said bar by springs 66 with levers 62 elevated above bars 60 and in the path of the charge as it enters the terminal.

On each lever 62 is provided a segment 67 engaging a segment lever 68 pivotally mounted on a crossbar 69 fastened to casing 59. Adjacent the ends of levers 62 is a roll 70 carried at the upper end of a yielding projectile stopping abutment or lever 71 pivoted at 72 to the casing 59. Lever 71 is connected by a link 73 with a piston 74 in a dashpot 75 and normally piston 74 is held by a spring 76 near the open end of dashpot 75 with the roll 70 at the limit of its movement toward the tube 2.

Figure 7:
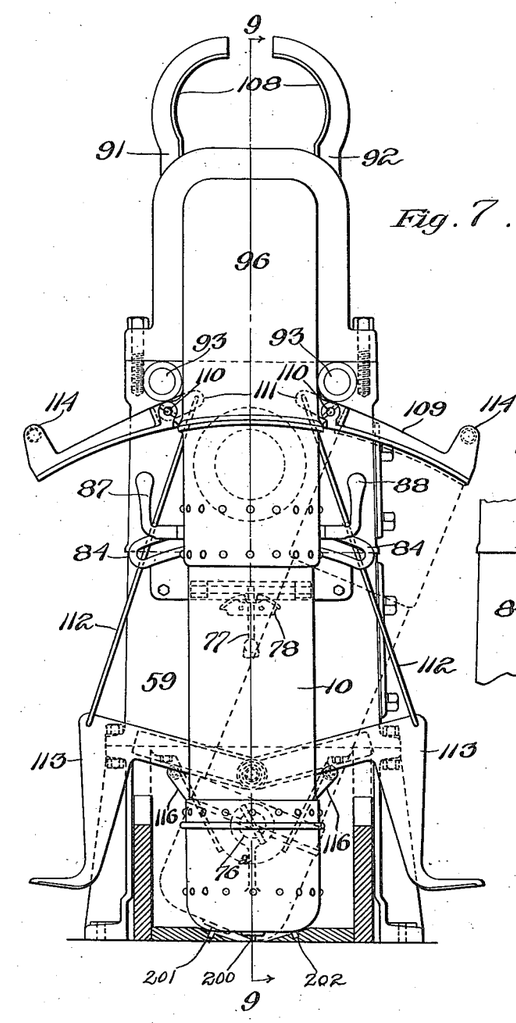
Fig. 7 is an end view of the delivery terminal Fig. 6.
Figure 8:
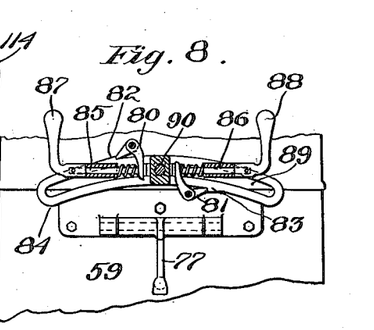
Fig. 8 is a detail view of the hand controlled locking mechanism for controlling the powder receiver.
Figure 9:
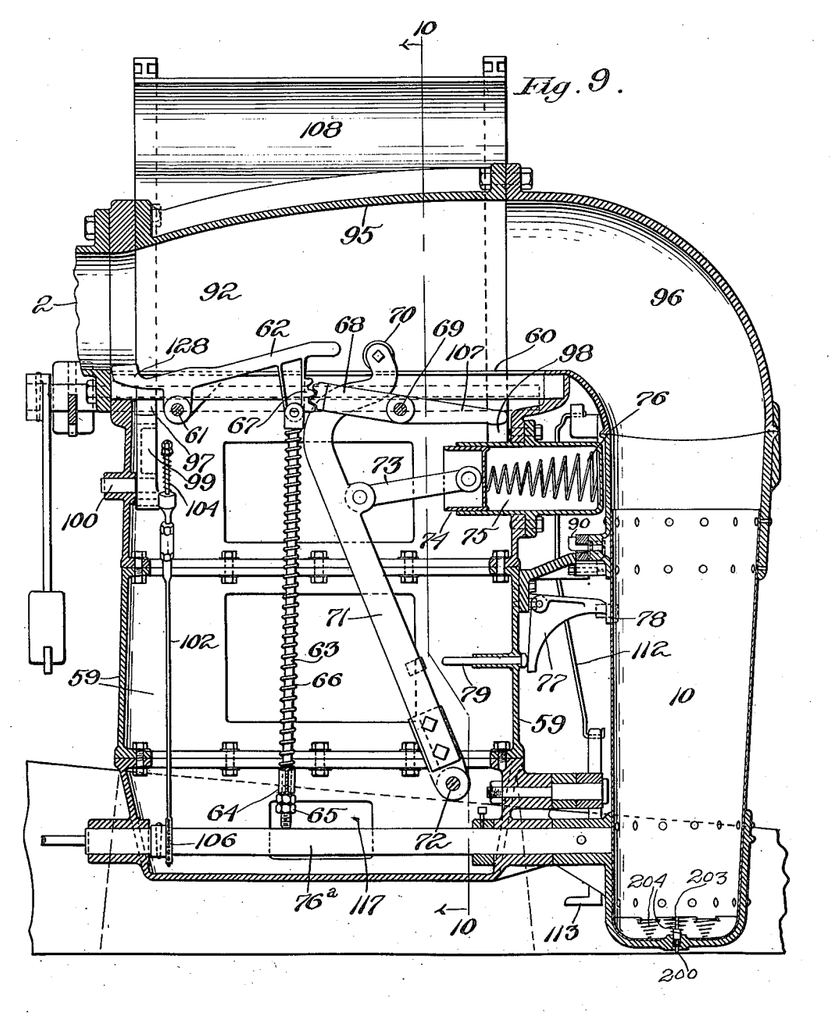
Fig. 9 is a section on line 9—9 of Fig. 7.

In the lower part of casing 59 is journaled a shaft 76ª which at one end carries the powder receiver 10 that normally is locked in the position shown in Fig. 7, by a latch 77 pivotally mounted on casing 59 engaging a socket 78 on said receiver 10. One arm of latch 77 is engaged by one end of a plunger 79 freely mounted in casing 59 with its other end in the path of lever 71. The receiver 10 is also locked in its normal position by two latches 80 and 81 pivotally mounted on receiver 10 and engaging shoulders 82 and 83 respectively on a bracket 84 fast to casing 59. On said receiver 10 are also mounted two slides 85 and 86 connected at their ends with latches 80 and 81 respectively and provided at their outer ends with handles 87 and 88 respectively. The bracket 84 is made with a slot 89 concentric with shaft 76$^a$ through which a hooked stud 90 projects from receiver 10 which serves by engaging said bracket to assist in supporting the receiver and by engaging the ends of slot 89 to limit the movement of the receiver when it is swung on the axis of shaft 76$^a$ as described later.

It will be noted that so long as the latch 77 engages socket 78, the receiver 10 cannot be moved from its normal position even though one of the latches 80 or 81 be disengaged from its shoulder 82 or 83. However when the receiver 10 is freed from latch 77 as described later, the gunner by grasping either handle 87 or 88 and pulling upon it can both free and open said receiver without any other operation, swinging the receiver either to the right or left, Fig. 7, according to which handle he grasps.

The floor of the projectile receiver 9 is made up of bars 60 as stated, while the side walls thereof consist of two doors 91 and 92 fast to shafts 93 journaled on the casing 59 and the top wall of a plate 95 that is fast to said casing. It will thus be seen that the projectile receiver in its normal position is tubular in form and in effect is a continuation of the tube 2 to the elbow 96 and powder receiver.

Figure 10:
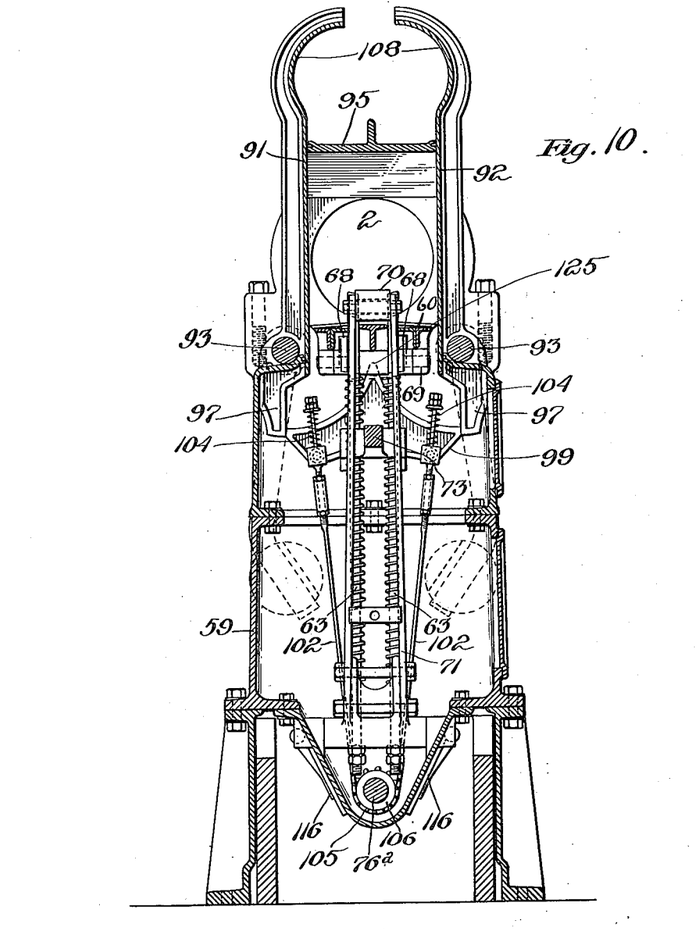
Fig. 10 is a section on line 10—10 of Fig. 9.
Figure 11:
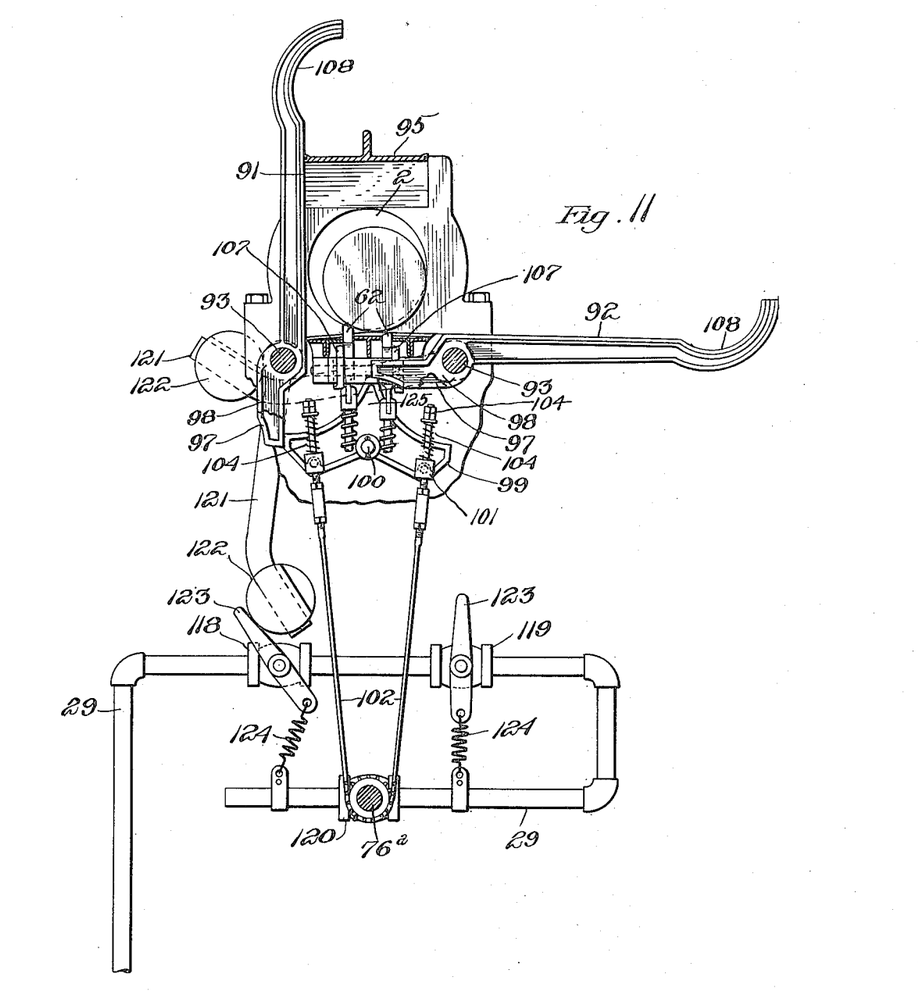
Fig. 11 is a portion of Fig. 10 showing the position of the parts with a projectile about to be shifted onto one of the doors or racks.
Figure 12:
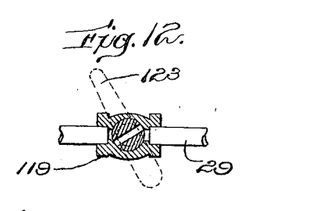
Figs. 12 and 13 are details hereinafter described.

The end of the projectile receiver opposite the tube 2 connects with one end of an elbow 96 that registers at its other end with and closely fits the upper end of the powder receiver 10. The doors 91 and 92 are each made with two arms 97 and 98 the former, coöperating with a rocker 99 pivotally mounted upon a stud 100, Fig. 11, projecting from casing 59 and the arm 98 coöperating with the arm 107 of one of the segment levers 68. Normally the rocker 99 locks the doors 91 and 92 in their closed positions by engaging the arms 97 as shown in Fig. 10. Swiveled to the rocker 99 are two blocks 101 and through each block 101 loosely extends a rod 102 provided at its upper end with nuts 103 between which and block 101 is interposed a spring 104. At their lower ends the two rods 102 are connected to the opposite end of a chain 105 engaging a sprocket 106 fast to shaft 76$^a$. It will be clear that when for example handle 88 is used to swing receiver 10 from its closed position to the right into the position indicated by dotted lines Fig. 7, the partial rotation thereby imparted to shaft 76$^a$ will act through chain 105 and one of the rods 102 to swing rocker 99 on stud 100 in a direction to free the door 92. If the other handle 87 is used to open receiver 10 in the opposite direction, the rocker 99 will be swung on the stud 100 in the opposite direction so as to free the door 91.

As the charge consisting of one or more bags of powder followed by the projectile discharges into the receiver 9, the bags of powder which are comparatively light, are deflected upwardly by the levers 62 over the roll 70 and fall through the elbow 96 into the powder receiver 10 being retarded by the elbow. The projectile, however, being very much heavier, depresses the levers 62 and the butt or blunt end of said projectile, strikes the roll 70 and swings lever 71 to the right (Fig. 9) thereby cushioning the impact and stopping the projectile by action of the dash pot 74 75, 76. The parts are so arranged that the projectile is thus stopped in a position opposite the doors 91 and 92 and directly above the levers 62, which latter are thereby held partially depressed with springs 66 compressed. During the movement of lever 71 to the right, due to the engagement of the projectile therewith, said lever strikes the plunger 79 and frees the receiver 10 from the latch 77, leaving said receiver free to be opened by either handle 87 or 88 for the removal of the powder. The opening of the receiver 10 acts to free the arm 97 of one of the doors 91 or 92 from rocker 99 and when that door is swung open into the position shown in Fig. 11, for example, the arm 98 of that door strikes and lifts the arm 107 of the segment lever 68 nearest that door and thereby depresses the lever 62 connected therewith, moving it down out of the path of the projectile. The other lever 62 being forced upwardly by its spring 66 acts to roll the projectile out onto the open door where it is rolled into a recess or trough 108 at the outer end of said door. When either door 91 or 92 is opened after receiver 10 has been opened, its arm 97 is swung upwardly and by engagement with an upwardly turned projecting nose 125 on the rocker 99 swings the latter back toward its normal position compressing one of the springs 104. As soon as said arm clears the upper end of said nose, the compressed spring swings the nose 125 back again under the arm 97 thereby locking the door, of which that arm forms a part, in its open position. The door remains thus locked open until the receiver 10 is returned to normal position whereupon the rocker 99 is returned to its normal position carrying the nose 125 out of locking engagement with the arm 97. As the arm 97 of the door is swung downward as the latter is closed, the rocker first yields and then snaps in behind said arm so as to lock the latter in its closed position. At each side of the lower end of the elbow 96 is a cap or cover 109 hinged at 110 to said elbow and provided with an arm 111 connected by a link 112 with a foot treadle 113. These caps or covers are normally in position to close or cover the upper end of the receiver 10 until it is desired to remove the powder. At that time the cover can be thrown by foot pressure on treadle 113 or lifted by hand by means of a handle 114.

The casing 59 together with doors 91 and 92, elbow 16 and receiver 10, make up a compartment or chamber that is isolated from the interior of the turret until it is opened for the removal of the charge except for the interval of time during which the charge is traveling through the tube 2 from the handling room to the turret. During this interval the air in advance of the charge is forced out of the tube 2 into the interior of the casing 59 from whence it escapes into the turret past the outwardly-opening spring-closed valves 116 controlling ports 117 at the bottom of the casing 59.

Figure 3:
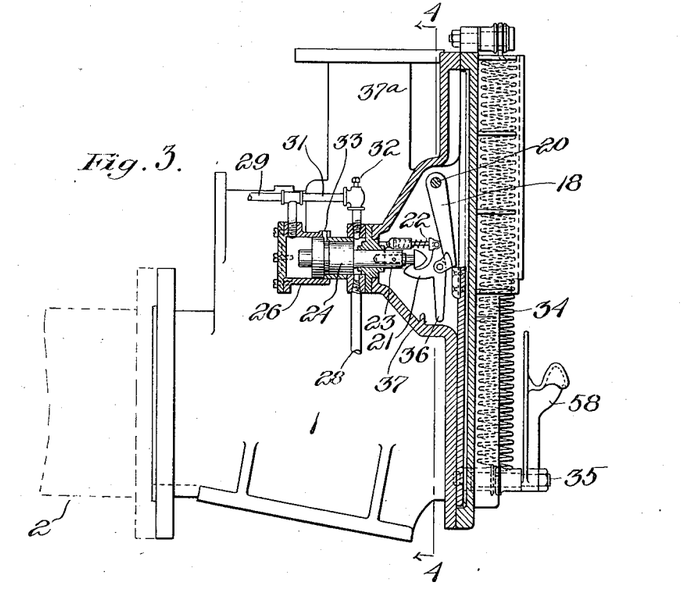
Fig. 3 is an elevation, partly in section, of the opposite side of the sending terminal shown in Fig. 2.
Figure 4:
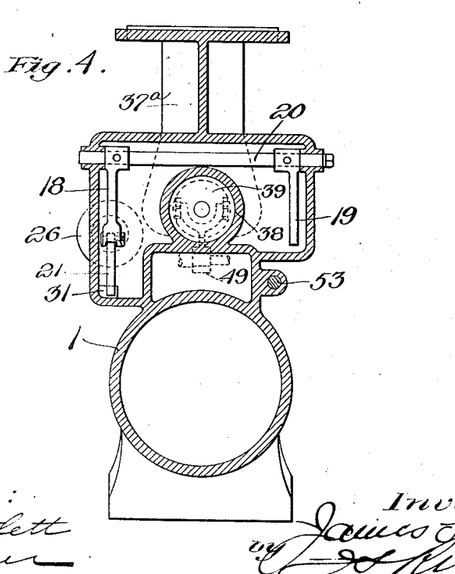
Fig. 4 is a section on line 4—4 of Fig. 3.

As stated, the opening of the gate 16 of sending terminal 1 is effected through the complete closing of the delivery terminal, and to accomplish this, the upper end of the pipe 29 is provided with three valves 118, 119 and 120, of which valves 118 and 119 are controlled by arms 121 fast to shafts 93 bearing weights 122 which counterbalance the weight of doors 91 and 92. The valve 120 has its stem connected with the end of said shaft 76ª so that when the powder receiver is opened in either direction, the valve 120 is closed, and when said receiver is closed, said valve is opened. The arms 121 engage arms 123 fast to the stems of valves 118 and 119 so as to open said valves when the doors are shut, springs 124 being provided on arms 123 to close said valves when the doors are opened. It will thus be seen that so long as the door 91 or 92 or receiver 10 is open, the upper end of pipe 29 will be closed and the plunger 23 will be caused, by the excess pressure in the larger end of the plunger, as heretofore described and as shown in Fig. 3, to engage but not operate dog 21. Also that when both doors and the receiver 10 are again closed, the upper end of said pipe 29 is opened to the atmosphere and the piston 24 shifted to the left (Fig. 3) by the pressure in the smaller end of the plunger from pipe 28, which is not equalized through the restricted opening of valve 32, thereby operating the dog 21 to release catches 18, 19, on which release spring 34 opens the gate 16 of the terminal 1 for another charge. The conveyer system is thus closed except at the receiver while the latter is open, so that communication through the open receiver and tube from the turret to the handling room is prevented.

In order to hold the powder receptacle 10 in its open position and prevent its closure before the powder has been removed, said receptacle is provided with a movable bottom 203 supported by springs 204. Connected with said bottom 203 is a plunger 200 whose lower end projects through the lower part of the receptacle 10 and is adapted to cooperate with either of two notches 201 or 202. As the receptacle 10 is swung open with the powder inside, the plunger 200 is forced by the weight of the powder into one of the notches 201 or 202, according to which side said receptacle is swung, thereby locking it in its open position and preventing the receptacle from being closed until the powder is removed. When the powder has been removed the springs 204 lift the plunger 200 out of engagement with the notch leaving the receptacle free to be closed.

The bend in the conveyer tube, by which the movement of the projectile and powder is turned from vertical to horizontal for delivery to the projectile receiver 9 and powder receiver 10, and the bend of the elbow 96 through which the powder passes to powder receptacle 10, act to retard the ammunition and aid in securing the delivery of the projectile and powder gently and without shock. This retarding and cushioning of the projectile and powder, together with the admission of only the amount of air required to secure the delivery of the charge, with the charge moving during the latter part of its transit by momentum, aid in preventing shock at the delivery end, and with the cushioning of the projectile and powder as delivered, assure the proper and safe delivery of the ammunition.

Figure 13:
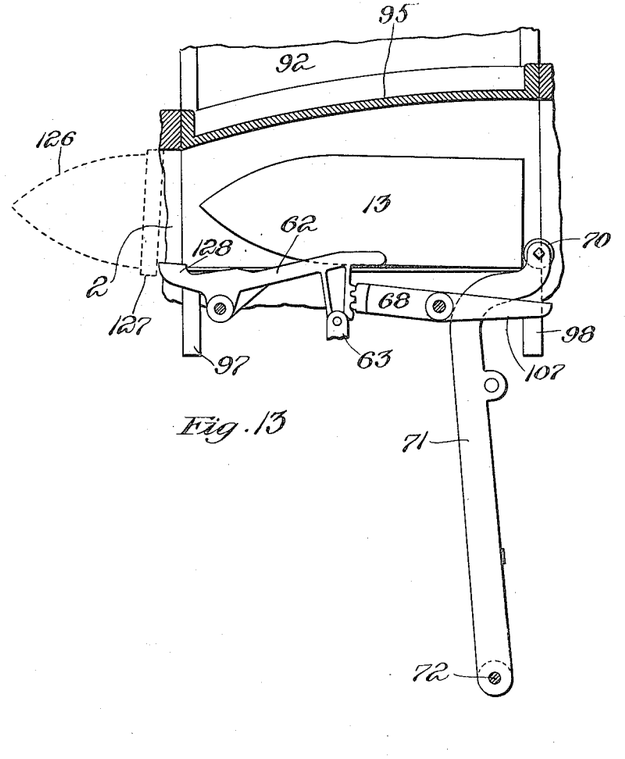

In practice the internal diameter of the tube 2 is larger than the diameter of the powder bags and the projectile 13, therefor I provide a cap 126 adapted to be applied to the conical end of the projectile said cap being made with a flexible rim 127 which snugly fits the interior of tube 2, the rim thus forming the piston by which the projectile is driven through the tube and the cap acting to guide and center the conical end of the projectile. It will thus be obvious that when a charge is in transit the full pressure of the air is transmitted to the projectile and powder bags through this cap 126. When a charge reaches the terminal 8 and the projectile slides onto the levers 62, arms 128, one of which is provided on each of said levers, are raised into position to engage the cap 126 as shown in Fig. 13, thereby removing the cap from the projectile. The caps thus removed may be afterward returned to the handling room to be used again. As shown, the shell is sent from the sending terminal to the delivery terminal butt end first, so that it can be inserted in the breech of the gun without turning it around, the delivery terminal in the construction shown being intended to extend from the tube 2 between two guns and in a direction from the nozzle toward the breech of the guns.

Having thus described my invention and set forth a construction embodying the same, what I claim as new and desire to secure by Letters Patent of the United States is,—

1. In a pneumatic ammunition conveyer, a conveyer tube, a sending terminal, a delivery terminal, a source of compressed air connected with said tube for driving charges of ammunition therethrough, a receptacle at said delivery terminal for receiving the charge, and means for preventing the despatching of a charge from said sending terminal while a charge is contained in said receptacle.

2. In a pneumatic ammunition conveyer, a conveyer tube, a sending terminal, a delivery terminal, a source of compressed air connected with said tube for driving charges of ammunition therethrough, an inclosed stationary receptacle at said delivery terminal for receiving the charge, a door closing said receptacle, means for locking said door closed, and means for preventing the opening of the door until the charge is delivered into the receptacle.

3. In a pneumatic ammunition conveyer, a conveyer tube, a sending terminal, a delivery terminal having a powder receptacle and a projectile receptacle, a source of air pressure connected with said tube for driving charges of ammunition therethrough, and means for automatically delivering the projectile and powder into their respective receptacles.

4. In a pneumatic ammunition conveyer, a conveyer tube, a sending terminal, a delivery terminal, a source of air pressure connected with said tube for driving charges of ammunition therethrough, a powder receiver, a projectile receiver, means for delivering the powder and projectile into their respective receivers, means for cushioning the delivery of the powder, and means for retarding and cushioning the delivery of the projectile.

5. In a pneumatic ammunition conveyer, a conveyer tube, a sending terminal, a delivery terminal, a source of air pressure connected with said tube for driving ammunition therethrough, a powder receiver, a projectile receiver, means for delivering the powder and projectile into their respective receivers, and means permitting the removal of said powder and said projectile from opposite sides of said receivers.

6. In a pneumatic ammunition conveyer, a conveyer tube, a sending terminal, a delivery terminal, a source of air pressure connected with said tube for driving ammunition therethrough, a projectile receiver, shelves adapted to support the projectile on opposite sides of said receiver, and means for ejecting the projectile from said receiver onto either one of said shelves.

7. In a pneumatic ammunition conveyer, a conveyer tube, a sending terminal, a delivery terminal, an air supply for driving ammunition through said tube, a receiver at the delivery terminal for receiving the ammunition, and means for preventing the sending of ammunition while ammunition is contained in the receiver.

8. In a pneumatic ammunition conveyer, a conveyer tube, a sending terminal, a delivery terminal, an air supply for driving ammunition through said tube, a receiver at the delivery terminal for receiving the ammunition, and means for preventing the sending of ammunition until the ammunition previously sent has been removed from the receiver and the receiver is ready to receive ammunition.

9. In a pneumatic ammunition conveyer, a conveyer tube, a sending terminal, a delivery terminal, an air supply for driving ammunition through said tube, an inclosed receiver at the delivery terminal for receiving the ammunition, means for locking said receiver closed, and means for preventing the opening of said receiver before the ammunition has been received.

10. In a pneumatic ammunition conveyer, a conveyer tube, a sending terminal, a delivery terminal, an air supply for driving ammunition through said tube, an inclosed receiver at the delivery terminal for receiving the ammunition, means for opening said receiver for the removal of the ammunition, and locking devices for preventing the closing of the receiver until the ammunition has been removed.

11. In a pneumatic ammunition conveyer, a conveyer tube, a sending terminal, a delivery terminal, an air supply for driving ammunition through said tube, a normally closed receiver at the delivery terminal, doors on opposite sides of the receiver adapted to support the ammunition, when opened, and means for automatically removing the ammunition from the receiver onto the door by the opening of one of the doors.

12. In a pneumatic ammunition conveyer, a conveyer tube, a sending terminal, a delivery terminal, an air supply for driving ammunition through said tube, a stationary receiver having a door for closing it, a shelf adapted to support the projectile at one side of the receiver, and means for automatically ejecting the projectile onto said shelf by the opening of the door.

13. In a pneumatic ammunition conveyer, a conveyer system including a conveyer tube, a sending terminal, a delivery terminal, an air supply for driving ammunition through said tube, and means for preventing the opening of communication from the delivery terminal through the tube to the space outside the system when the delivery terminal is open.

14. In a pneumatic conveyer, a closed conveyer system including a conveyer tube, a sending terminal, a delivery terminal, an air supply for driving an article through said tube, and means, including a movably mounted controlling element located at the delivery terminal, for preventing the opening of the conveyer system except from the delivery terminal and subsequent to an actuation of said controlling part.

15. In a pneumatic ammunition conveyer, a conveyer tube, a sending terminal, a delivery terminal, an air supply for driving ammunition through said tube, a vertical receiver at the delivery terminal mounted to swing toward the horizontal for removal of the ammunition, and means for covering the receiver during the swinging movement.

16. In a pneumatic ammunition conveyer, a conveyer tube, a sending terminal, a delivery terminal, an air supply for driving ammunition through said tube, a receiver at the delivery terminal mounted to move from normal position for removal of the ammunition, and a locking device preventing the return of the receiver to normal position until the ammunition has been removed.

17. In a pneumatic ammunition conveyer, a conveyer tube, a sending terminal, a delivery terminal, an air supply for driving ammunition through said tube, a normally closed receiver at the delivery terminal, means for opening said receiver for the removal of the ammunition, and a locking device for preventing the closing of the receiver until the ammunition has been removed.

18. In a pneumatic ammunition conveyer, a conveyer tube, a sending terminal, a delivery terminal, an air supply for driving simultaneously projectile and powder ammunition through said tube, and means for automatically separating the projectile and powder at the delivery terminal.

19. In a pneumatic ammunition conveyer, a conveyer tube, a sending terminal, a delivery terminal, an air supply for driving simultaneously projectile and powder ammunition through said tube, means for automatically separating the projectile and powder at the delivery terminal, and means for retarding and cushioning the projectile.

20. In a pneumatic ammunition conveyer, a conveyer tube, a sending terminal, a delivery terminal, an air supply for driving simultaneously projectile and powder ammunition through said tube, means for automatically separating the projectile and powder at the delivery terminal, and means for retarding and cushioning the projectile and powder.

21. In a pneumatic ammunition conveyer, a conveyer tube, a sending terminal, a delivery terminal, an air supply for driving simultaneously projectile and powder through said tube, and means at the delivery terminal acting to retard the projectile to separate the projectile and powder.

22. In a pneumatic ammunition conveyer, a conveyer tube, a sending terminal, a delivery terminal, an air supply for driving simultaneously projectile and powder through said tube, a projectile receiver, means acting to retard and stop the projectile in the projectile receiver while permitting the powder to pass onward, and means for cushioning the delivery of the powder.

23. In a pneumatic ammunition conveyer, a conveyer tube, a sending terminal, a delivery terminal, an air supply for driving simultaneously projectile and powder through said tube, a projectile receiver, means acting to retard and stop the projectile in the projectile receiver while permitting the powder to pass onward, and means for retarding the powder after its separation from the projectile.

24. In a pneumatic ammunition conveyer, a conveyer tube, a sending terminal, a delivery terminal, an air supply for driving simultaneously projectile and powder through said tube, and means at the delivery terminal for stopping one part of the charge while permitting the other part to pass onward, and means at the delivery terminal for stopping the other part of the charge.

25. In a pneumatic ammunition conveyer, a powder receiver, a projectile receiver, means for delivering powder and projectiles into their respective receivers, a device for locking the powder receiver closed, and means for unlocking said device by the receipt of a projectile in the projectile receiver.

26. In a pneumatic ammunition conveyer, a powder receiver, a projectile receiver, means for delivering powder and projectiles into their respective receivers, devices for locking the projectile receiver closed, and means for unlocking said devices by the opening of the powder receiver.

27. In a pneumatic ammunition conveyer, a powder receiver, a projectile receiver, means for delivering powder and projectiles into their respective receivers, and means operated by the powder receiver for locking the projectile receiver closed until the powder receiver is opened and for locking the projectile receiver open until the powder receiver is closed.

28. In a pneumatic ammunition conveyer, a projectile receiver provided with doors for opening the receiver on either side, a powder receiver, means for delivering powder and projectiles into their respective receivers, and locking devices for locking said projectile receiver doors closed operated to unlock either door by the opening of the powder receiver.

29. In a pneumatic ammunition receiver, a projectile receiver provided with doors for opening the receiver on either side, a powder receiver adapted to be opened for delivery of the powder at either side, means for delivering powder and projectiles into their respective receivers, locking devices for the projectile receiver doors, and means controlled by the powder receiver for unlocking one or the other of the doors according to the opening of the powder receiver.

30. In a pneumatic ammunition conveyer, a conveyer, a sending terminal, a delivery terminal, having a projectile receiver, and a powder receiver, means for delivering powder and projectiles into their respective receivers at the delivery terminal, and means controlled by both receivers for preventing the sending of ammunition until both receivers are ready to receive it.

31. In a pneumatic ammunition conveyer, a conveyer, a sending terminal, a delivery terminal, a projectile receiver, a powder receiver, means for delivering projectiles and powder into their respective receivers, locking devices for locking the sending terminal closed, and means controlled by both receivers for unlocking said locking devices when both receivers are ready to receive ammunition.

32. In a pneumatic ammunition conveyer, a conveyer, a sending terminal, a delivery terminal, a projectile receiver, a powder receiver, means for delivering powder and projectiles into their respective receivers, locking devices for preventing the dispatch of ammunition, an air pipe extending from the receiving terminal to the sending terminal, and means controlled by both receivers for pneumatically unlocking said devices when both receivers are ready to receive ammunition.

33. In a pneumatic ammunition conveyer, a conveyer tube, a sending terminal, a delivery terminal having a projectile receiver and a powder receiver, an air supply for driving ammunition through said tube, and means for delivering powder and projectiles from said tube to their respective receivers.

34. In a pneumatic ammunition conveyer, a conveyer tube, a sending terminal, a delivery terminal having a projectile receiver and a powder receiver, an air supply for driving ammunition through said tube, and means acting to stop one part of the ammunition while permitting the other part to pass onward for delivery of powder and projectiles to their respective receivers.

35. In a pneumatic ammunition conveyer, a conveyer tube, a sending terminal, a delivery terminal having a projectile receiver and a powder receiver, an air supply for driving ammunition through said tube, and means acting to stop the projectile while permitting the powder to pass onward for delivery of powder and projectiles to their respective receivers.

36. In a pneumatic ammunition conveyer, a conveyer tube, a sending terminal, a delivery terminal, an air supply for driving ammunition through said tube, a carrier piston, and means at the delivery terminal for separating said piston from the ammunition.

37. In a pneumatic ammunition conveyer, a conveyer tube, a sending terminal, a delivery terminal, an air supply for driving ammunition through said tube, a carrier piston behind said ammunition, and means at the delivery terminal for stopping said piston independently of the ammunition while permitting the ammunition to move onward.

38. In a pneumatic ammunition conveyer, a conveyer tube, a sending terminal, a delivery terminal, an air supply for driving ammunition through said tube, a carrier piston behind said ammunition, a stop at the delivery terminal out of position to stop the ammunition, and means for automatically moving said stop into position to stop the forward movement of the carrier piston.

39. In a pneumatic ammunition conveyer, a transmission device provided with a dispatching terminal, a tube through which a charge, comprising a projectile and a mass of explosive material may be conveyed, a pusher or piston, against which pneumatic pressure is exerted to propel said charge through the tube, and a delivery terminal having means for separately stopping the projectile and explosive material and provisions for guiding said projectile and material toward their respective stopping means through divergent paths.

40. In a pneumatic ammunition conveyer, a transmission device provided with a dispatching terminal, a tube through which a charge, comprising a projectile and a mass of explosive material, may be conveyed, a pusher or piston, against which pneumatic pressure is exerted, to propel said charge through the tube, and a delivery terminal having means for deflecting one of said parts of the charge from the path of the other.

41. In a pneumatic ammunition conveyer, a transmission device provided with a dispatching terminal, a tube through which a charge, comprising a projectile and a mass of explosive material, may be conveyed, and a delivery terminal having means for separately stopping the projectile and explosive material and provisions for removing one at least of said parts of the charge from its stopping means.

42. In a pneumatic ammunition conveyer, a transmission device provided with a dispatching terminal, a tube through which a charge, comprising a projectile and a mass of explosive material, may be conveyed, and a delivery terminal having means for separately stopping the projectile and explosive material.

43. In a pneumatic ammunition conveyer, a transmission device provided with a dispatching terminal, a tube through which a charge, comprising a projectile and a mass of explosive material, may be conveyed, a delivery terminal adapted to separately arrest the component parts of said charge, and a source of pressure fluid for propelling the charge, said transmission device having provisions for lessening the speed of a charge traversing the tube, as the delivery terminal is approached.

In testimony whereof, I have signed my name to this specification in the presence of two subscribing witnesses, this 13th day of August, A. D. 1908.

JAMES T. COWLEY.

Witnesses:
MARGARET M. LYONS,
W. O. HILDRITH.